United States Patent [19]
Marson

[11] Patent Number: 4,651,340
[45] Date of Patent: Mar. 17, 1987

[54] TELEPHONE ENTRANCE TERMINAL AND NETWORK INTERFACE

[75] Inventor: Albert U. Marson, Riverview, Mich.

[73] Assignee: Michigan Bell Telephone Company, Detroit, Mich.

[21] Appl. No.: 698,229

[22] Filed: Feb. 4, 1985

[51] Int. Cl.⁴ ............................................. H04M 1/00
[52] U.S. Cl. ................... 379/156; 379/327; 339/198 R
[58] Field of Search .................. 179/98, 99 R, 99 LC, 179/178; 339/91 R, 97 R, 125 R, 198 R, 122 R, 18 R, 18 C

[56] References Cited

U.S. PATENT DOCUMENTS

| 4,20,261 | 3/1982 | Scerbo et al. ........................... 179/98 |
| 1,834,184 | 12/1931 | Schramm ........................... 200/51.1 |
| 3,222,471 | 12/1965 | Steinkamp ......................... 200/51.07 |
| 3,919,495 | 11/1975 | Berglund et al. ....................... 179/98 |
| 4,213,013 | 7/1980 | Perna et al. ............................. 179/98 |
| 4,224,485 | 9/1980 | Krumreich ........................... 200/51.1 |
| 4,227,762 | 10/1980 | Scheiner ............................ 339/91 R |
| 4,231,628 | 11/1980 | Hughes et al. ................. 339/17 LC |
| 4,313,039 | 1/1982 | De Luca et al. ....................... 179/98 |
| 4,335,929 | 6/1982 | Abernethy ......................... 339/97 R |
| 4,343,527 | 8/1982 | Harrington et al. ............ 330/125 R |
| 4,390,755 | 6/1983 | Pierresteguy .......................... 179/98 |

FOREIGN PATENT DOCUMENTS

1460007 10/1965 France .

Primary Examiner—James L. Dwyer
Attorney, Agent, or Firm—Harness, Dickey & Pierce

[57] ABSTRACT

The entrance terminal and network interface connects between the building entrance cable on the telephone facility side and the telephone customer's equipment. A modular, space saving arrangement of single line and multi-line network interfaces provides flexible and readily adaptible system for connecting selected incoming lines to either one or several multiple line users and single line users. By this arrangement, a convenient disconnect point between telephone facilities and all customers is provided. The arrangement greatly reduces costs, saves space and simplifies installation and trouble-shooting.

32 Claims, 8 Drawing Figures

TELEPHONE ENTRANCE TERMINAL AND NETWORK INTERFACE

BACKGROUND AND SUMMARY OF THE INVENTION

The present invention relates generally to telephone equipment and more particularly to telephone entrance terminals and network interfaces usable to implement both multiple line telephone connections and single line telephone connections.

In compliance with present FCC regulations, telephone networks are designed so that they may be readily split between the telephone utility company side (the "facility side") and the telephone user side (the "Customer Provided Equipment side", "CPE side" or "user side"). In accordance with this practice, telephone networks are conventionally designed with a plug-type connector or network interface which serves as the line of demarcation between telephone utility company property and customer property. This line of demarcation serves to identify which party is responsible for installation and maintenance and also serves as a convenient point at which the telephone network can be temporarily severed so that one side of the network can be tested without affecting the other side.

Although practices vary, depending on particular local telephone company standards, particular customer's needs, and the vintage of the installation or subsequent modifications to it, a typical telephone network will usually include some form of entrance cable leading into the building, a lightning protector, and a terminal. A typical telephone entrance cable consists of 25 pairs of insulated conductors, although larger and smaller cables are also prevalent. Each pair of conductors comprises one transmission line or communication line. In this regard, it will be understood that two conductors are normally required to comprise a complete electrical circuit. According to industry practice, one of these conductors is referred to as the "ring" conductor or wire, while the other is referred to as the "tip" conductor or wire. In order to insure network-wide compatibility, particularly when implementing touch tone dialing or digital data transmission, it is necessary that the respective tip and ring polarities should not become crossed. In other words, the entire telephone network must be implemented so that between any two pieces of communication equipment (perhaps located hundreds of miles apart) the ring wire at one piece of equipment is electrically the same wire as at the other piece of equipment. The failure to follow this convention can, and often does, result in faulty performance of touch tone telephones and digital data communication equipment.

The building entrance terminal described above provides a termination point for the building entrance cable after it has passed through the lightning protector. The building entrance terminal also serves as a connection or junction between the telephone company facilities and one or more network interfaces. Commonly, building entrance terminals are produced in a number of different sizes to accommodate different numbers of conductor pairs, e.g. 12, 25, 50 and 100 pairs. It is often customary to place the building entrance terminal together with the ligtning protector in a main entrance room or terminal room within a building. Often this main entrance room is located on the ground floor, particularly in a multiple story building.

According to customary practice, the building entrance terminal feeds one or more network interface units, which in turn serve as the connection point or line of demarcation between telephone utility company equipment and customer provided equipment. In the case of multiple story buildings or buildings with a multiplicity of tenants, network interface units can be located throughout the building, using riser cables to reach the upper floors. If a riser cable is used, it is not uncommon to terminate the riser cable with a riser terminal, which in turn connects to one or more network interface units.

The particular equipment connected to the customer or user side depends essentially on the customer's needs. If the customer needs only a single line phone set (one telephone number) then a single line network interface unit such as the RJ11 network interface unit may be used. This network interface unit provides a modular jack to receive the miniature plug such as shown in U.S. Pat. No. 4,231,628. If the customer requires multiple extensions, then a multiple line network interface unit such as the RJ21 network interface unit has been traditionally used. The RJ21 network interface unit provides a readily attachable and detachable 25-pair connector to receive a mating connector supplied by the customer for connecting to the customer's key equipment, electronic switching equipment, switchboard, phone sets, and the like.

While the above describes one possible telephone network configuration, there are many variables and thus many other possible configurations.

If, for example, it is desired to implement only one multiple line telephone system within a building, then under present practice a separate multiple line network interface unit must be installed for connecting between the building entrance terminal and the customer provided equipment. If it is also desired to implement one or more separate single line telephone networks (as at some later date), then one or more additional single line network interface units must also be installed in order to connect between the building entrance terminal and the single line telephonic devices.

As a building's demand for multiple lines and single lines can vary over the years with changing tenants, the practice has heretofore been to install or remove additional multiple line and single line network interface units on an ad hoc basis according to the customer's needs. Such practice has tended to place various network interface units in scattered locations throughout a building. This increases installation costs and makes fault detection and trouble-shooting more difficult, time consuming and expensive. In addition to the inconveniences and expense caused by this ad hoc approach to telephone system installation, each of the above required items, the building entrance terminal, the multiple line network interface unit and the single line network interface unit, are generally bulky, comparatively complex and expensive.

The increasing popularity of customer installed telephones, answering machines, data communication equipment such as modems, facsimile transmission equipment and the like, has made it increasingly important that the telephone connection equipment be simplified. In this regard, modular equipment which will readily connect to miniature telephone line cord jacks is highly desirable. Consistent with the modular concept, there is also a need to miniaturize and consolidate telephone building entrance terminal equipment and network interface equipment, in order to lower system costs and installation and trouble-shooting costs.

The present invention accomplishes the above improvements in the telephone system by providing a combined terminal and network interface apparatus for providing both single line and multiple line connections to a telephone network. The invention thus replaces the separate building entrance terminal and network interface units with a single modularized unit, thereby reducing the overall system costs and simplifying installation and trouble-shooting.

In accordance with the invention, the combined terminal and network interface apparatus comprises a framework having a plurality of normally noncommunicating groups of associated signal conductors or contacts disposed thereon. A first means for establishing multiple connections is provided for connecting to a first part of the telephone network such as the incoming telephone cable or facility side, while a second means for establishing multiple connections is provided for coupling to a second part of the telephone network, such as customer provided equipment. A first one of the conductors of a given group of associated conductors is coupled to the first connection means, while a second one of the conductors of the given group is coupled to the second connection means. The associated signal conductors of a given group are normally open, but may be bridged using a bridge connector which attachably and detachably connects to the framework for providing signal communication between a given pair of conductors, when attached to the framework. When attached, the bridge connector provides signal communication between at least one line of the first and second connection means. By selectively attaching a purality of bridge connectors at selected locations on the framework, any one of a number of different possible multi-line connections can be established between the incoming telephone cable and the customer's multiple line system.

The invention further comprises at least one single line connector for attachably and detachably connecting to the framework, for providing signal communication between the single line connector and either the first or the second connection means. More specifically, the single line connector provides signal communication between a selected line or group of lines coming from the facility side telephone cable, in order to establish a single line telephone connection.

Also in accordance with the invention, a network interface apparatus is provided comprising a framework having a plurality of electrical contacts arranged in longitudinally spaced relation to one another and having a plurality of upwardly extending guideposts interdigitated with the contacts. At least one single line connector module is provided for attachably and detachably connecting to the framework. The connector module comprises a module body having a plug-receiving aperature in one face thereof, and a rigid extension structure extending laterally from the module body. The extension structure includes a receptacle for engagement with one of the guideposts and has at least one conductive member for electrical connection to a selected one of the plurality of electrical contacts. The extension structure, when engaged with one of the guideposts, supports the connector module in a fixed position relative to the framework, so that the plug-receiving aperature is substantially and laterally offset relative to the contacts.

Further in accordance with the invention is provided a combined terminal and network interface apparatus for connection to a telephone network providing signal conductors of first and second polarities. The invention comprises a framework having a first row of pairs of associated conductors and a second row of pairs of associated conductors. The first and second rows are arranged such that each of the pairs in the first row corresponds to a pair in the second row, and thereby defines a plurality of conductor groups of corresponding pairs. A means is provided for connecting the conductor groups to the telephone network signal conductors so that the polarity of any conductor group is opposite to that of the next adjacent conductor group. The apparatus may be used with the bridge connectors and single line connectors described above to implement a wide variety of different possible connections. The unique alternating polarity arrangement insures that the tip and ring lines will always be connected in the proper polarities. The invention is therefore fully compatible with touch tone dialing systems and digital data transmission equipment.

For a more complete understanding of the invention, its objects and advantages, reference may be had to the following description taken in conjunction with the accompanying drawings.

BRIEF DESCRIPTION OF THE DRAWINGS

FIG. 3 is a plan view of the terminal and network interface apparatus of the invention;

DESCRIPTION OF THE PREFERRED EMBODIMENT

Figure 1:
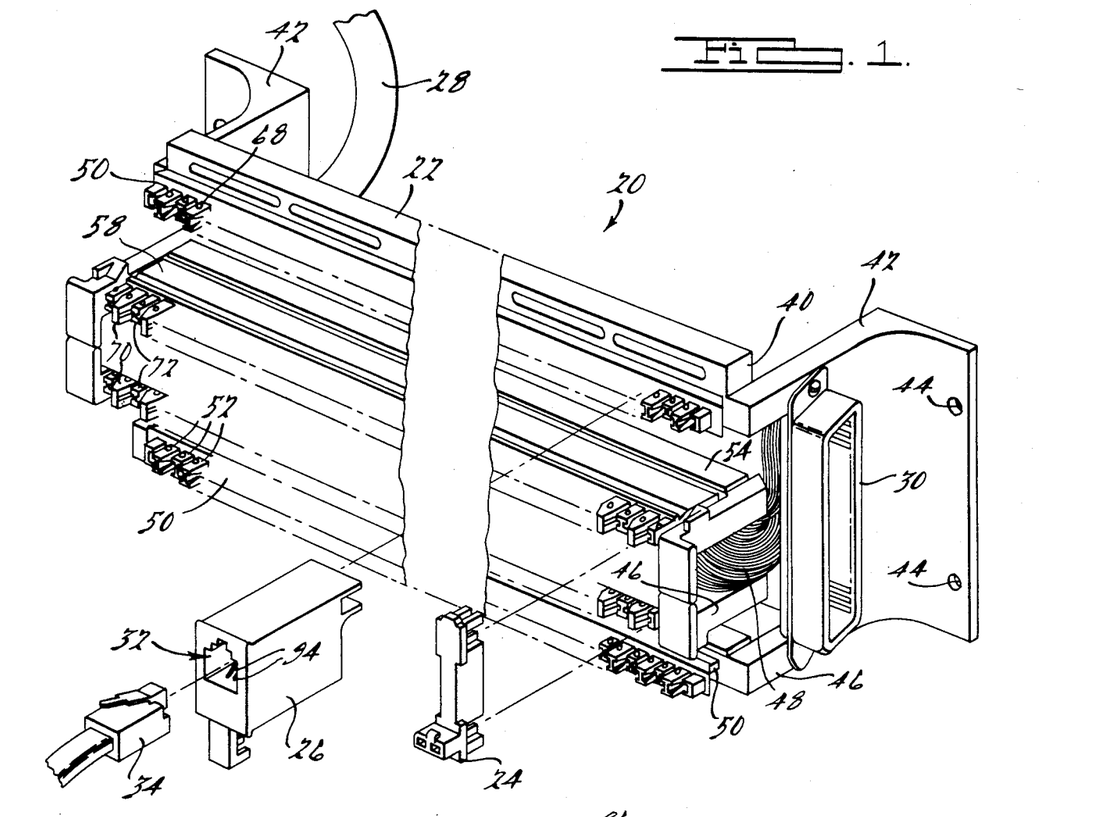
FIG. 1 is an exploded perspective view of the terminal and network interface apparatus of the invention.

Referring to FIG. 1, the combined terminal and network interface apparatus of the invention is indicated generally at 20. The terminal and network interface apparatus comprises framework 22, one or more bridge connectors 24 and one or more single line tapping connectors 26. In addition, apparatus 20 includes a first means for establishing multiple connections to the facility side of the telephone network, preferably in the form of multiple conductor entrance cable 28. Similarly, a second means for establishing multiple connections to the user side of the telephone network, preferably in the form of a multiple pin connector jack 30. In accordance with present day practice, connector 30 serves as a network interface or line of demarcation between the telephone utility equipment and the customer provided equipment (CPE) for multiple line installations. Connector 30 is preferably compatible with RJ 21 standards to accept an RJ 21 jack or plug coming from the customer's key equipment or electronic switching equipment.

The single line tapping connectors 26 also serve as a network interface or line of demarcation between the telephone utility company equipment and the customer provided equipment for single line installations. The single line tapping connectors 26 are provided with a plug receiving aperature 32 for receiving a miniature telephone line cord jack such as miniature jack 34, preferably compatable with the RJ 11 standard. Accordingly, it will be seen that the invention provides network interfacing capabilities for both multiple line users and single line users on a single, modularized apparatus. Connector 30 provides a convenient disconnection point at which a multiple line user may be severed from the telephone network for system trouble shooting. The single line tapping connectors 26 provide the same disconnect function for single line users. In addition, the apparatus 20 also serves as a convenient termination to the entrance cable or telephone facilities. These separate functions have heretofore been performed using three separate and discrete pieces of equipment. As will be explained more fully below, the apparatus 20 of the present invention allows the telephone utility company to set up a wide variety of different configurations for servicing multiple line users and single line users from a single modularized apparatus.

With specific attention to the multiple line user, the RJ 21 standard contemplates a 25-pair interface, i.e. 25 communication lines each comprising 2 wires. While the RJ 21 interface will accommodate up to 25 pairs (lines), it is not uncommon for some multiple line users to utilize fewer than all 25 pairs. To accommodate the needs of such users, the invention comprises bridge connectors 24 which are used to select and establish a connection of selected lines between the facility side and the user side (CPE). In the presently preferred embodiment, one bridge connector 24 activates one line, that is, one pair of wires, of a multiple line network, by bridging between and electrically coupling one group of contacts or conductors on the facility side with one group of contacts or conductors on the user side. The single line tapping connectors 26 or establish contact with one line by tapping a selected group of contacts or conductors on the facility side. Although physically capable of placement to make contact with the conductors on the user side, the single line tapping connector 26 is not normally used in this fashion, as this would not provide the single line user with a connection to the telephone network outside the building.

Figure 2:
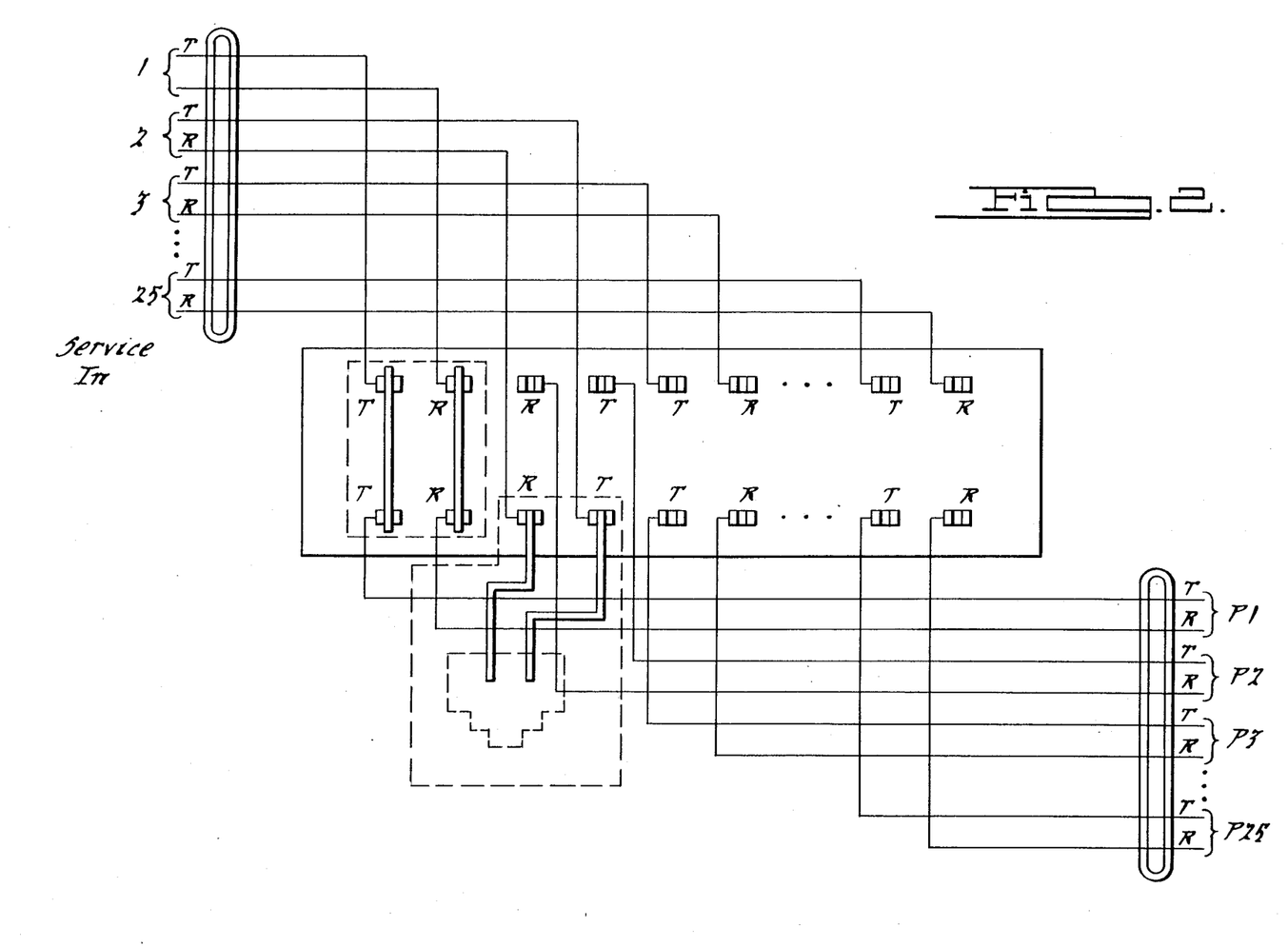
FIG. 2 is a schematic diagram depicting the terminal and network interface circuit of the present invention.

For a better understanding of the manner in which the invention provides both multiple and single line capabilities, reference may be had to the schematic circuit diagram of FIG. 2. In FIG. 2 the building entrance cable 28 and multiple line connector 30 are illustrated diagrammatically as providing 25 communication lines or "pairs" for a total of 50 conductors. It will, of course, be understood that the invention may be implemented using greater or fewer numbers of lines and that 25 lines are shown to illustrate the principles of the invention without restricting the scope of the appended claims. It will be noted that each line or pair of wires associated with entrance cable 28 has been consecutively numbered. Each of the wires in a given pair has been further designated as "T" or "R" to indicate a relative polarity, T designating the "tip" polarity and R designating the "ring" polarity. As those skilled in the telephone and telecommunications art will recognize, these tip and ring polarities must be properly connected to the telephone network in order to allow touch tone dialing and certain data transmission equipment to function properly. Simply stated, the tip and ring wires must not become cross-connected or certain equipment will not function properly. In a similar fashion, connector 30 has been consecutively numbered and polarity labeled.

With continued reference to FIG. 2, framework 22 is illustrated diagrammatically as comprising a first row 36 and a second row 38 of longitudinally spaced contacts. Each contact in first row 36 corresponds to a laterally spaced contact in second row 38. The contacts may be arranged conceptually into associated groups of four, corresponding to the facility side and user side of one communication line. Note in particular that the contacts in rows 36 and 38 have polarity labels. Note further that the tip and ring polarity of any given group of four contacts is opposite to that of the next adjacent group of contacts. The purpose of alternating the polarity of adjacent contacts in this fashion is to insure compatibility with polarity-sensitive touch tone equipment and data transmission equipment. As will become more apparent from the description which follows, this alternating polarity arrangement also has the advantage of allowing minimal intercontact spacing (between longitudinally adjacent contacts) while permitting single line tapping connectors to make contact with consecutively numbered, adjacent facility side conductors. As shown in the schematic diagram, the facility side conductors (from entrance cable 28) are connected in alternately staggered fashion to the conductors of rows 36 and 38. Accordingly, line "1" is connected in row 38, line "2" is connected in row 36, line "3" is connected in row 38, and so forth. The conductors of connector 30 are coupled to the conductors in rows 36 and 38 in a similar alternately staggered fashion.

FIG. 3 illustrates the terminal and network interface 20 in plan view. With reference to this view and also to the perspective view of FIG. 1, framework 22 comprises a generally rectangular platform 40 supported on opposing standards 42. As illustrated, standards 42 are preferably provided with holes 44 which may be used when securing framework 22 to a building structure. In the presently preferred embodiment, standards 42 are provided with upstanding posts 46 for protecting the connector post structures yet to be discussed. Posts 46 are spaced apart, as illustrated, and also serve as a means for routing and organizing the many individual wires associated with entrance cable 28 and connector 30. See, for example, the manner in which connector 30 is connected to wire bundle 48 in FIG. 1.

Platform 40 further includes a first pair of longitudinally extending and parallel support rails 50. Support rails 50 may be fashioned as continuously extending upstanding flanges or as a plurality fashioned as continuously extending upstanding flanges or as a plurality of longitudinally arranged socket forming nodes 52. This latter construction is illustrated in FIGS. 1 and 3. Platform 40 further includes a second pair of longitudinally extending support rails 54 disposed between support rails 50. Preferably support rails 54 are also comprised of longitudinally arranged socket-forming nodes similar to those illustrated as at 52. Support rails 50 and 54 are parallel and longitudinally aligned with the upstanding posts 46 and thereby define duct spaces 56 for routing wire bundles. In FIG. 3 the center duct space shows wire bundle 48 disposed therein.

In the presently preferred embodiment, the socket forming nodes 52 of support rails 50 and 54 are adapted to receive extension clip modules 58. The extension clip modules, as will be further described below, provide an electrical interface between the wires of entrance cable 28 and connector 30 and the bridge connectors 24 and single line tapping connectors 26. In addition, these extension clip modules also provide the mechanical means by which the bridge connectors and single line tapping connectors are attachably and detachably connected to framework 22.

Figure 4:
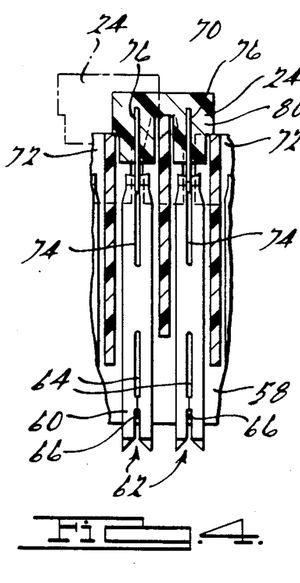
FIG. 4 is a partial longitudinal cross-sectional view taken through the bridge connector substantially along the line 4—4 of FIG. 3.
Figure 5:
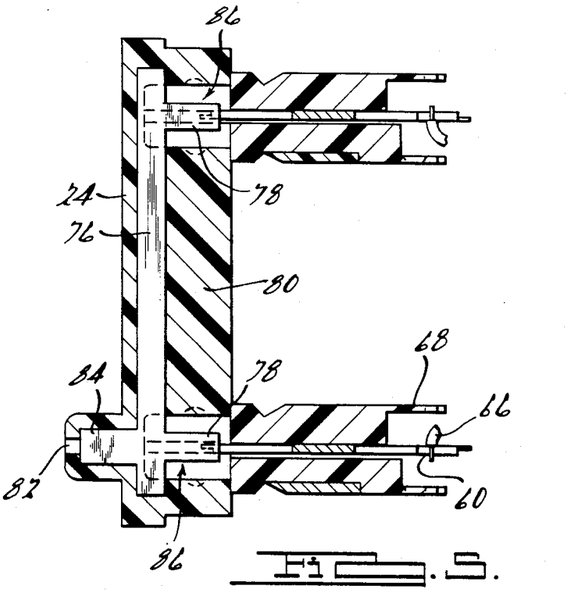
FIG. 5 is a partial transverse cross-sectional view through the bridge connector taken substantially along the line 5—5 of FIG. 3.

FIGS. 4 and 5 show the extension clip module construction in greater detail. With reference to FIG. 4, and with continued reference to FIG. 1, extension clip module 58 houses a plurality of longitudinally arranged and upstanding clip-on connectors 60. The connectors 60 have forked ends 62 and are split as at 64 to permit the fork ends to spread apart in gripping an individual wire conductor such as wire 66. Wire conductor 66 may also be seen in FIG. 5. The forked ends 62 are preferably thinner than the remainder of the conductor 60, forming a knife edge which will cut through wire insulation without severing the wire itself. This knife-edge structure allows the extension clip module to make electrical contact with one or more insulated wires of wire bundle 48 without requiring that the wires first be stripped of insulation. Electrical contact is made simply by inserting the ends of selected wires in the spaces between the socket forming nodes 52 (FIG. 1) and then by forcing the extension clip module onto the nodes at the appropriate location. As the clip module is forced into place, the knife edges of the respective forked ends 62 are guided between the nodes 52, sever the insulation on the wires placed between those nodes, and bite into the conductor of each wire to establish electrical contact. Once in place, the extension clip module is held in place by detent structures 68 on nodes 52 and modules 58. The clip modules 58 may be fabricated as a single piece extending the entire length of a support rail, or preferably the modules may be fabricated as smaller segments to make installation easier. In the presently preferred embodiment, extension clip modules 58 are installed along the entire length of both support rails 54, but are not installed on either of support rails 50.

Opposite the forked end 62, the extension clip modules 58 are provided with a plurality of longitudinally spaced guideposts 70 and 72. Guideposts 70 and 72 alternate between two different heights, those designated as guideposts 70 being the taller and those designated as guideposts 72 being the shorter. Taller guideposts 70 have a tapered end configuration, while guideposts 72 have a substantially squared-off end (FIG. 1). Conductors 60 extend to the upstanding edge of the clip module adjacent guideposts 70 and 72. These ends of conductors 60 are also split as at 74 to provide a pair of fingers for receiving the blade conductor of a bridge connector or a single line tapping connector. FIGS. 4 and 5 illustrate the connection of a bridge connector 24 in this fashion.

Bridge connector 24 includes a pair of transverse conductors 76 with downwardly depending blade-type contacts 78 at the opposite ends thereof. In use, these blade-type contacts 78 insert between the fingers of split-end 74, thereby establishing electrical conduction between the conductor 60 of a given node on row 36 with the conductor of the corresponding node on row 38. Preferably, the bridge connector 24 has a plastic body 80 which encapsulates a pair of transverse conductors, the pair corresponding to one telephone communication line. If desired, the body 80 may be provided with a test point aperature 82 and the transverse conductor 76 provided with an upstanding extension 84. A test probe, inserted into aperature 82, may thus establish contact with the upstanding extension 84, allowing the technician to perform tests upon that conductor while it is in the circuit. As seen in FIG. 4, the pair of conductors which make up bridge connector 24 are arranged transversely of one another so that they each make contact with the corresponding conductor 60.

To prevent the bridge connectors from being improperly installed, the body portion 80 is provided with a pair of receptacles 86, one at each blade contact vicinity. The receptacles 86 are designed to receive the taller tapered guideposts 70 but not the adjacent shorter guideposts 72. When the receptacle 86 is positioned over a taller guidepost 70, the bridge connector 24 may be depressed onto the guidepost a sufficient distance to permit the blade-type contacts 78 to connect with conductors 60. If the receptacle is positioned over one of the shorter guideposts 72, as illustrated in phantom lines in FIG. 4, the bridge connector 24 is prevented by contact with the adjacent guideposts 70 from being depressed sufficiently to permit electrical contact between contacts 78 and conductors 60. In this fashion, the bridge connector is restricted to making a connection between associated pairs of conductors in one single communication line. The bridge connector will not, therefore, permit the inadvertent connection of the tip or ring wire of one line while simultaneously connecting the adjacent tip or ring wire of another, unrelated, line. While the presently preferred bridge connection is configured as described and shown herein, it will be understood that bridge connectors may have other configurations. If desired, the bridge connector can be implemented using short lengths of jumper wire as will now be described.

The configuration of the guideposts 70 and 72 has the additional advantage of permitting the telephone technician to insert the stripped ends of jumper conductor wires in order to establish a connection with other circuits on the same framework or with telephone circuits terminated on separate terminal and network interface units or with other pieces of telephone equipment. As an example, a technician could, if desired, insert a pair of conductor wires on both sides of a guidepost 70, making contact with the corresponding contacts 60. The opposite ends of the pair of wires might then be connected to another similar terminal and network interface 20 or to another type of circuit board or equipment. Although jumper wires are not usually required, the invention does provide this additional flexibility so that it can accommodate the occasional non-standard installation.

In addition, the extension clip modules 58 may also be inserted on the socket forming nodes of the outside rails 50, along the entire length or partial length thereof. When this has been done, these additional clip modules may also serve as points of connection for the bridge connectors, the single line tapping connectors, or jumper wires. It will, therefore, be seen that the present invention provides a wide degree of flexibility through its modularized construction. Furthermore, while the presently preferred bridge connectors contain a pair of transverse conductors, for connecting the facility side and the user side of a single line in a multiple line network, bridge connectors for other numbers of conductors may also be implemented without departing from the scope of the invention.

Figure 6:
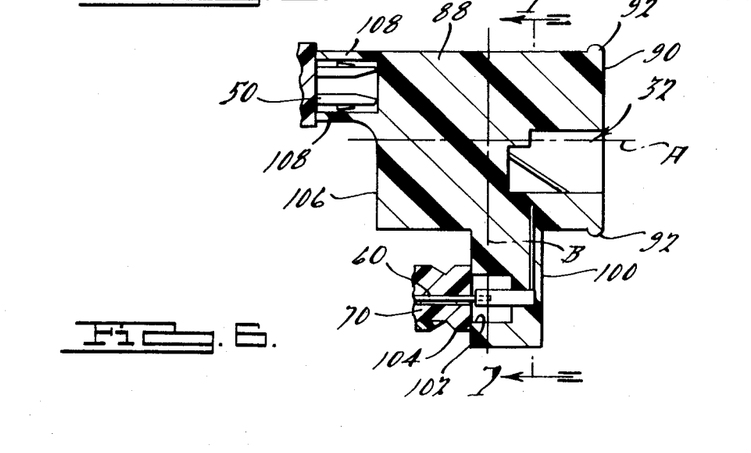
FIG. 6 is a partial transverse cross-sectional view of the single line tap connector of the invention taken substantially along the line 6—6 of FIG. 3.
Figure 7:
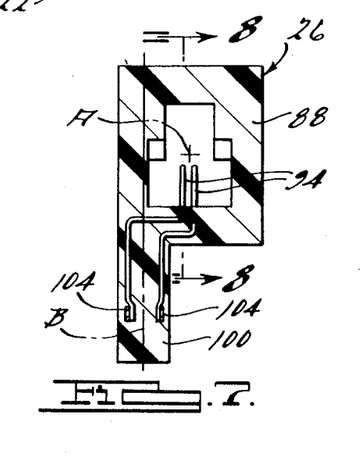
FIG. 7 is another cross-sectional view of the single line tap connector of the invention taken substantially along the line 7—7 of FIG. 6.
Figure 8:
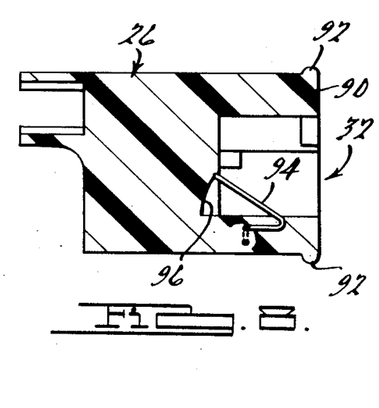
FIG. 8 is another cross-sectional view of the single line tap connector of the invention taken substantially along the line 8—8 of FIG. 7.

In addition to the bridge connectors or multiple line networks, the invention also comprises one or more single line tapping connectors 26 which are shown in detail in FIGS. 6, 7 and 8. Although the specific construction of the tapping connectors may vary somewhat, depending upon the configuration of the framework 22, the presently preferred embodiment of tapping connector comprises a module body 88 having the plug-receiving aperature 32 in the uppermost face 90 thereof. Face 90 is provided with slightly extended and rounded finger grips 92 which allow the tapping connector to be attached and detached by the technician even in confined spaces. The aperature 32 is configured as shown to accept a miniature telephone jack or the like.

In the presently preferred embodiment, the single line tapping connector 26 makes connection with one and only one telephone line or circuit. Two conductors are normally adequate for connection to the miniature telephone jack. Accordingly, FIGS. 6, 7 and 8 illustrate these two conductors 94 which have a portion thereof disposed within the plug-receiving aperature 32. As illustrated in FIG. 8, the portion disposed within the aperature is angled inwardly and centrally and is free to flex within the arcuate space 96 when a miniature jack such as jack 34 (FIG. 1) is inserted. However, the invention is not limited to simple two-wire connections and the tapping connector may be readily modified to accommodate different numbers of conductors. In this regard, a four-wire tapping connector 98 is illustrated in FIG. 3. It will be noted that the four-wire tapping connector includes four conductors 99 within its plug-receiving aperature 101 and connects to both the opposite and the adjacent rows 36 and 38.

Returning to the preferred embodiment of FIGS. 6, 7 and 8, the single line tapping connector also includes a rigid and integrally formed extension 100 which is provided with a receptacle 102 (similar to receptacle 86) for receiving a selected guidepost 70. Like the bridge connectors, the rigid extension 100 of the tapping connector 26 is configured to prevent it from being improperly connected across one of the short guideposts 72. Conductors 94 follow the circuitous path illustrated in FIGS. 6, 7 and 8 and are electrically attached to a pair of blade-type contacts 104. The blade-type contacts 104 are substantially of the same configuration as the blade-type contacts 78 and are used to make contact with the conductors 60 interdigitated with the guideposts 70 and 72.

Integrally formed on the lower face 106 of module body 88 is a pair of finger extensions 108 which are spaced apart to receive either of the support rails 50. These finger extensions 108 engage the support rail and serve to align the tapping connector 26 and prevent it from rotation about the axis of the plug-receiving aperature. The rigid extension 100 makes a frictionally tight connection with guidepost 70 and also serves to align the tapping connector and to prevent it from coming loose, wobbling or rotating. Providing stability is particularly important in this application, since the single line tapping connector 26 serves as the network interface or line of demarcation between the telephone utility and the customer. It is anticipated that the tapping connector 26 would constitute telephone utility company property, while miniature jack 34 would constitute customer provided equipment. Thus it is the single line tapping connector/miniature jack interface which the customer may be required to locate and utilize. Accordingly, the tapping connector 26 must be positively and securely attached so that the customer will not accidentally detach it while plugging in or unplugging a miniature jack.

Referring again to FIG. 3, the presently preferred embodiment further includes a numbered designation strip or reference plate 110 which is slidably carried in the duct space 56 directly above wire bundle 48. This reference plate is appropriately marked with consecutive numbers used to identify each of the guideposts 70. The guideposts which are given simple numerical designations correspond to the facility side of the telephone network, while the guideposts designated with a "P" prefix followed by a number correspond to the user side of the telephone network. Thus it will be seen that each pair of guideposts bearing like numbers corresponds to one individual communication line (one wire pair). These same numerical designations are also given in the schematic diagram of FIG. 2. Reference plate 110 may be removed by sliding it between the innermost upstanding posts 46 to reveal the wire bundle 48 beneath.

Reference plate 110 is inscribed so that the plastic body 80 of the bridge connectors directly overlies a pair of like numbers. This gives a clear indication of which lines of a multiple line interface have been bridged into operation. Preferably the body 80 is made of a clear plastic material to facilitate viewing of the reference plate. Similarly, the rigid extension 100 of each single line tapping connector directly points to the line number to which the tapping connector is connected. This also provides a clear indication of which line the single line tap is made.

From FIG. 3, note that the intercontact spacing "S" between the interdigitated contacts is substantially less than the width "W" of tapping connector module body 88. In other words, the conductors 69, spaced between guideposts 70 and 72, are densely packed at a conductor-to-conductor distance significantly smaller than the average diameter of the plug receiving aperature 32. In order to accommodate such a contact density, the single line tapping connectors 26 employ rigid extensions 100 which are substantially the same width as the bridge connectors 24 and which are significantly narrower than the width of the module body 88. The staggered or alternating relationship between consecutively numbered pairs of contacts allows single line tapping connectors to be connected to consecutively numbered telephone lines without physical interference with one another. In this regard, FIG. 3 illustrates a group of three tapping connectors 26 connected respectively to lines 9, 10 and 11. Note that in normal operation, the tapping connectors 26 are not connected to the user side of the multiple line network (i.e. those terminals with a "P") as this would fail to connect the single line user to the telephone facilities.

In the presently preferred embodiment, the plug receiving aperature 32 of a single line tapping connector 26 will be seen to generally define an axis A through the geometric center thereof. The rigid extension 100 may be seen to define a second axis B through its geometric center. These axes are denoted in FIG. 6. Preferably axes A and B are orthogonal to one another and nonintersecting as seen in FIG. 7. It will, however, be appreciated that the preferred relationship between aperature 32 (axis A) and extension 100 (axis B) shall not be considered as limiting the invention in its broadest aspects. For example, the extension 100 might be alternately located so that its axis B intersects with the axis A of the plug receiving aperature. Moreover, the module body and extension may be fabricated so that the axes A and B are not orthogonal to one another. Also, if desired, the upstanding posts 46 may be omitted or disposed longitudinally further apart than shown in FIG. 3 to give additional clearance space for installing tapping connectors 26 at the endmost locations, i.e., locations designated as 1 and 25 on the reference plate 100.

While the invention has been described in its preferred embodiment, it is to be understood that the invention is capable of modification without departing from the true scope and spirit of the invention in its broader aspects, as defined and set forth in the appended claims.

I claim:

1. A combined terminal and network interface apparatus for providing both single line and multiple line connections to a telephone network having a facility side and a user side comprising:
   a framework having a plurality of normally noncommunicating groups of associated conductors disposed thereon;
   a first means for establishing multiple connections to said facility side of said telephone network;
   a second means for establishing multiple connections to said user side of said telephone network;
   a first one of said conductors of a given group being coupled to said first means and a second one of said conductors of said given group being coupled to said second means;
   at least one bridge connector means for attachably and detachably connecting to said framework and for selectively providing signal communication between the associated conductors of at least one of said groups, thereby establishing a connection between said first and second means to provide signal communication between said facility side and said user side;
   at least one single line connector for attachably and detachably connecting directly to and mounting directly on said framework and for selectively tapping at least one of said conductors, thereby providing signal communication between said facility side and said user side.

2. The apparatus of claim 1 wherein said conductors comprise electrical contacts.

3. The apparatus of claim 1 wherein said plurality of groups are longitudinally spaced and wherein said conductors of a given group are transversely spaced.

4. The apparatus of claim 1 wherein said conductors are arranged in at least two parallel rows.

5. The apparatus of claim 1 wherein each of said conductors individually comprises at least two electrical contacts.

6. The apparatus of claim 1 wherein said bridge connector comprises a plurality of electrical contacts.

7. The apparatus of claim 1 wherein said bridge connector comprises at least four electrical contacts.

8. The apparatus of claim 1 wherein said bridge connector comprises at least two conductors.

9. The apparatus of claim 1 wherein said first and second means each comprise a plurality of associated pairs of signal conductors and wherein each group of conductors on said framework comprises at least two pairs of electrical contacts, one pair of said electrical contacts being connected to a pair of signal conductors of said first means and another pair of said electrical contacts being connected to a pair of signal conductors of said second means.

10. The apparatus of claim 1 wherein said single line connector comprises at least two electrical contacts.

11. The apparatus of claim 1 wherein said single line connector provides a plug receiving aperature.

12. The apparatus of claim 1 wherein said single line connector provides at least four electrical contacts.

13. The apparatus of claim 1 wherein said framework is provided with a support rail and said single line connector is provided with means for engaging said rail and for aligning said single line connector on said framework.

14. A combined terminal and network interface apparatus for a telephone system comprising:
    a framework having a plurality of electrical contacts arranged in longitudinally spaced relation to one another and having a plurality of upwardly extending guideposts interdigitated with said contacts;
    at least one single line connector module for attachably and detachably connecting directly to and mounting directly on said framework;
    said connector module comprising a module body having a plug-receiving aperture in one face thereof, and a rigid extension means extending laterally from said module body;
    said extension means having a receptacle for engagement with one of said guideposts and having at least one conductive member for electrical connection to a selected one of said contacts; and
    wherein said extension means, when engaged with one of said guideposts, supports said connector module in a fixed position relative to said framework such that said plug-receiving aperture is disposed adjacent to said contact.

15. The apparatus of claim 14 wherein said plug-receiving aperture is substantially laterally offset relative to said contacts.

16. The apparatus of claim 14 wherein said framework further includes at least one support rail disposed in laterally offset relation to said contacts and wherein said connector module further comprises a means for engaging said support rail.

17. The apparatus of claim 14 wherein said extension means has a plurality of conductive members for electrical connection to a selected plurality of said contacts.

18. The apparatus of claim 14 wherein said plug-receiving aperture defines a first axis through the geometric center thereof and wherein said extension means lies along a second axis through the geometric center thereof and wherein said first and second axes are orthogonal.

19. The apparatus of claim 18 wherein said first and second axes are nonintersecting.

20. The apparatus of claim 14 wherein at least one of said guideposts is formed to prevent said receptacle from engagement with said one guidepost.

21. The apparatus of claim 14 wherein said guideposts are formed to prevent said receptacle from engagement with every alternate one of said guideposts.

22. The apparatus of claim 14 wherein said connector module has two rigid extension means each extending laterally from said module body.

23. A combined terminal and network interface apparatus for connection to a telephone network providing signal conductors of first and second polarities, comprising:

a framework having a first row of pairs of associated conductors and a second row of pairs of associated conductors;

said first and second rows being arranged such that each of said pairs in said first row corresponds to a pair in said second row and thereby defines a plurality of conductor groups of corresponding pairs;

means for connecting said conductor groups to said signal conductors of said telephone network such that the polarity of any conductor group is opposite to that of the next adjacent conductor group;

at least one single line connector for attachably and detachably connecting directly to and mounting directly on said framework, said single line connector having an extension means carrying a pair of conductive members for electrical connection to selected pairs of associated conductors;

said single line connector being attachable to only selected pairs of associated conductors so as to maintain the same sense of polarity between associated conductors and conductive members for all selected pairs.

24. The apparatus of claim 23 further comprising at least one bridge connector for attachably and detachably connecting to said framework and for selectively providing signal communication between said first row and said second row.

25. The apparatus of claim 23 further comprising at least one single line connector for attachably and detachably connecting to said framework and for selectively tapping at least one of said conductors, thereby providing signal communication with one of said first and second rows.

26. The apparatus of claim 23 wherein said first and second rows are parallel and said corresponding pairs lie on lines orthogonal to said rows.

27. The apparatus of claim 23 wherein said connecting means includes at least one multiple conductor cable.

28. The apparatus of claim 23 wherein said framework includes a plurality of upwardly extending guideposts interdigitated with said pairs of associated conductors.

29. The apparatus of claim 28 further comprising at least one single line connector for attachably and detachably connecting to said framework, said single line connector having a receptacle for engagement with a selected one of said guideposts and having at least two conductive members for electrical connection to a selected pair of said associated conductors.

30. The apparatus of claim 28 wherein said guideposts are longitudinally spaced apart a predetermined distance and said apparatus further comprises at least one single line connector module for attachably and detachably connecting to a selected one of said guideposts, said connector module comprising a module body having a plug-receiving aperture therein, and wherein said predetermined distance between guideposts is substantially less than the average diameter of said aperture.

31. The apparatus of claim 23 wherein said pairs of associated conductors in each of said rows are spaced a predetermined distance apart and wherein the apparatus further comprises a connector module for connection to a selected pair of conductors and having a plug-receiving aperture substantially larger in mean diameter than said predetermined distance.

32. The apparatus of claim 23 wherein said pairs of associated conductors in each of said rows are spaced a predetermined distance apart and wherein the apparatus further comprises a plurality of conductor modules for connection to selected pairs of conductors, each module comprising a module body and a rigid extension means extending laterally from said module body for establishing electrical contact with said selected pairs of conductors, and each module being of a size relative to said predetermined distance such that two such modules placed in side-by-side relation establish contact with pairs of conductors separated by at least one pair of conductors.

* * * * *

UNITED STATES PATENT AND TRADEMARK OFFICE
CERTIFICATE OF CORRECTION

PATENT NO. : 4,651,340

DATED : March 17, 1987

INVENTOR(S) : Albert U. Marson

It is certified that error appears in the above-identified patent and that said Letters Patent is hereby corrected as shown below:

On the Title Page References Cited: "4,20,261" should be
— 4,320,261 —

Column 3, line 36                  "purality"
should be — plurality —

Column 5, line 14                 "compatable"
should be — compatible —

Column 5, line 47                 "or" should
be — each —

Column 6, line 23                 "purpose of"
should be — purpose for —

Column 10, line 40                "69" should
be — 60 —

Column 14, line 31, Claim 32
"conductor" should be — connector —

Signed and Sealed this

Twenty-second Day of March, 1988

*Attest:*

DONALD J. QUIGG

*Attesting Officer*          *Commissioner of Patents and Trademarks*